United States Patent [19]
Kane et al.

[11] Patent Number: 5,642,790
[45] Date of Patent: Jul. 1, 1997

[54] AUTOMATIC WHEEL LUBRICATOR

[76] Inventors: Thomas J. Kane, 693 Ridgecrest Rd., Akron, Ohio 44303; Thomas E. Kane, 141 N. Rose Blvd #3, Akron, Ohio 44302

[21] Appl. No.: 710,564

[22] Filed: Sep. 19, 1996

[51] Int. Cl.$^6$ ................................................ F16N 7/12
[52] U.S. Cl. .................. 184/102; 184/109; 118/232; 118/264; 118/320
[58] Field of Search ...................... 184/102, 3.1, 3.2; 118/232, 244, 256, 258, 264, 320

[56] References Cited

U.S. PATENT DOCUMENTS

| | | | |
|---|---|---|---|
| 1,326,357 | 12/1919 | McClenathen et al. | 118/232 |
| 3,658,152 | 4/1972 | Mueller | 118/233 |
| 4,563,975 | 1/1986 | Kozlowski | 118/320 |
| 4,587,925 | 5/1986 | Cook | 118/232 |
| 4,621,671 | 11/1986 | Kane et al. | 157/1.1 |
| 4,723,563 | 2/1988 | Kane | 118/320 |
| 4,802,556 | 2/1989 | Lauber | 184/102 |
| 4,834,159 | 5/1989 | Burger | 157/1.1 |

*Primary Examiner*—Thomas E. Denion
*Attorney, Agent, or Firm*—Roger D. Emerson

[57] ABSTRACT

A method and apparatus for applying a lubricant to an object is disclosed. The lubrication apparatus includes a rotatable and cylindrically shaped brush for applying the lubricant to the object, a housing for holding the brush, and a pump for applying the lubricant to the brush located in a chamber positioned below the brush. A vertical slide cylinder moves the brush in a generally vertical direction along the central axis in and out of the chamber, and a horizontal slide cylinder moves the brush in a generally horizontal direction transverse to the central axis to contact the object. The chamber has a sloped chamber cap connected to the top portion of the chamber for collecting lubricant that drips from the brush. The brush is preferably rotated by a motor. The method of applying the lubricant to the object includes the steps of applying the lubricant to the brush in the chamber, moving the brush to a vertical position equal that of the object, moving the brush horizontally to contact the object, and lubricating the object by rotating the object and the brush.

18 Claims, 5 Drawing Sheets

AUTOMATIC WHEEL LUBRICATOR

Background of the Invention

1. Field of Invention

This invention pertains to the art of methods and apparatuses for automatically lubricating parts, and more specifically to methods and apparatuses for automatically lubricating wheels to prior to the mounting of tires thereon.

2. Description of the Related Art

In the past, tires were lubricated manually before they were mounted onto wheels. The process was time-consuming and often wasteful of the tire lubricant. Applicant recognized a need for an automated apparatus and method for lubricating the wheels. Applicant also recognized the need to lessen the waste of lubricant that drips from the brush, and the need to prevent lubricant from dripping onto the floor of the workplace.

The present invention contemplates a new and improved method and apparatus for lubricating wheels which is simple in design, effective in use, and overcomes the foregoing difficulties and others while providing better and more advantageous overall results.

SUMMARY OF THE INVENTION

In accordance with the present invention, a new and improved method and apparatus for lubricating wheels is provided which allows the process of lubricating wheels to be accomplished automatically rather than manually.

More particularly, in accordance with the present invention, a lubrication apparatus for applying an associated lubricant to an associated object includes a brush for applying the associated lubricant to the associated object, the brush being rotatable about a central axis. The lubrication apparatus also includes a housing for holding the brush whereby the brush is mounted to the housing, an application apparatus for applying the associated lubricant to the brush, and a chamber positioned below the brush. A top portion of the chamber has an opening, the opening being generally circular in shape with a circumference, the brush being insertable into the opening of the chamber. The lubrication apparatus also includes a vertical movement apparatus for moving the brush in a generally vertical direction along the central axis in and out of the chamber through the opening and a horizontal movement apparatus for moving the brush in a generally horizontal direction transverse to the central axis to contact the object.

According to one aspect of the present invention, a method of lubricating an associated object with an associated lubricant includes the steps of applying the associated lubricant to a brush from a chamber, moving the brush to a vertical position equal that of the associated object, moving the brush horizontally to contact the associated object, and lubricating the associated object by rotating the associated object and the brush.

According to another aspect of the present invention, a method of replacing a brush of a lubrication apparatus is disclosed where the lubrication apparatus includes a housing, the housing further including a tiltable bracket and bracket pins for holding the brush, a chamber, and a vertical movement apparatus. The method includes the steps of removing the brush from the chamber using the vertical movement apparatus, tilting the brush and the bracket, removing the bracket pins from the bracket and the brush, removing the brush from the bracket, inserting a new brush into the bracket, inserting the bracket pins into the bracket and the new brush, and tilting the brush and the bracket.

According to one aspect of the present invention, a wheel lubricator automatically lubricates wheels.

According to another aspect of the present invention, the brush of the wheel lubricator may be coated with lubricant automatically.

According to another aspect of the present invention, the brush may be coated on every cycle or on varying cycles.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
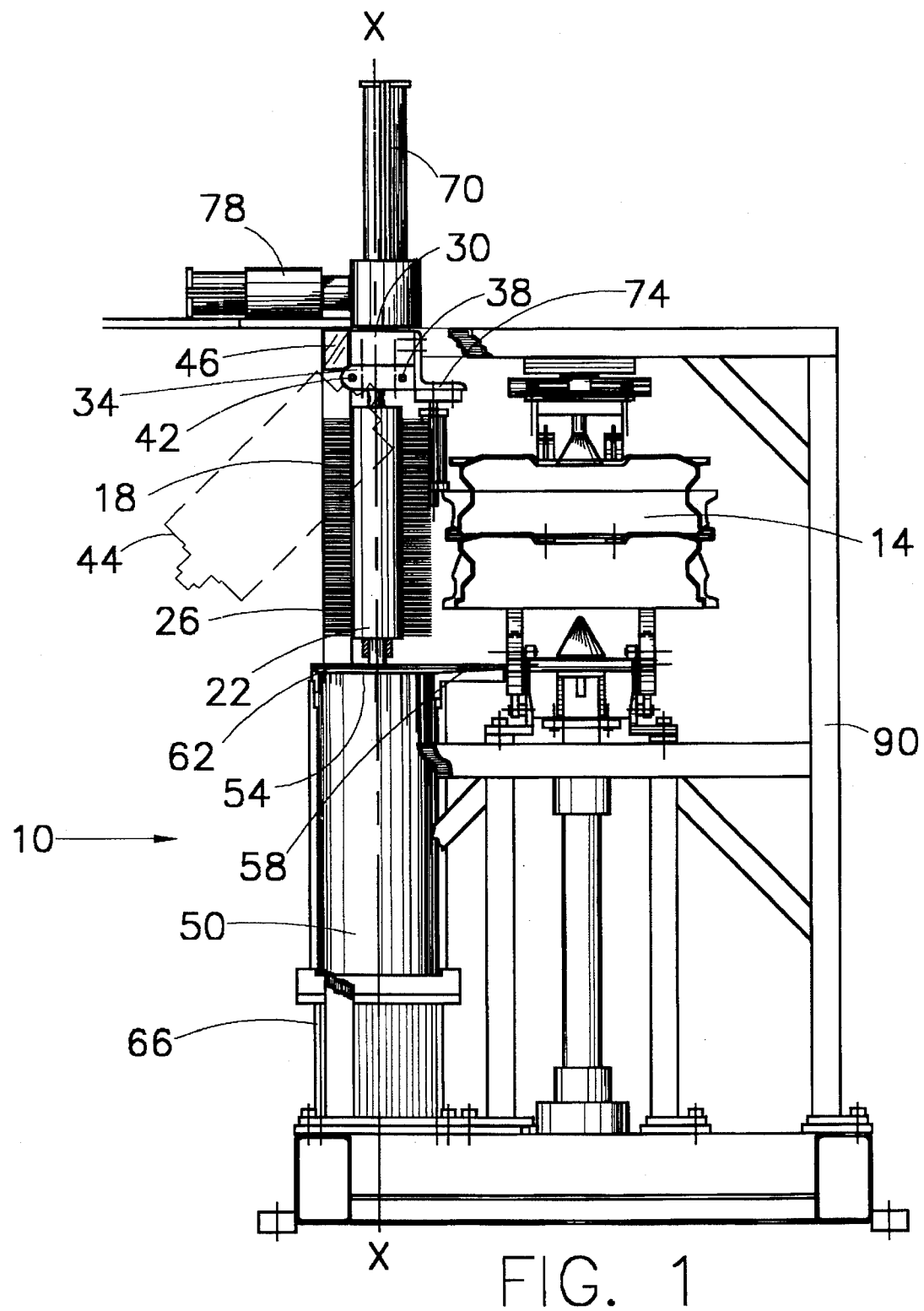
FIG. 1 is a side view of an automatic wheel lubricator.

Referring now to the drawings wherein the showings are for purposes of illustrating a preferred embodiment of the invention only and not for purposes of limiting the same, FIG. 1 shows a side view of an automatic wheel lubricator 10. The automatic wheel lubricator 10 is used to lubricate or soap a wheel 14 prior to mounting the wheel with a tire (not shown). Lubricating or soaping the wheel 14 makes mounting the tire easier and less likely to damage the tire, particularly in the bead area, by reducing the friction between the wheel and the tire. Any suitable lubricant for mounting a tire which is chosen with sound engineering judgment may be used in accordance with the present invention.

Figure 2:
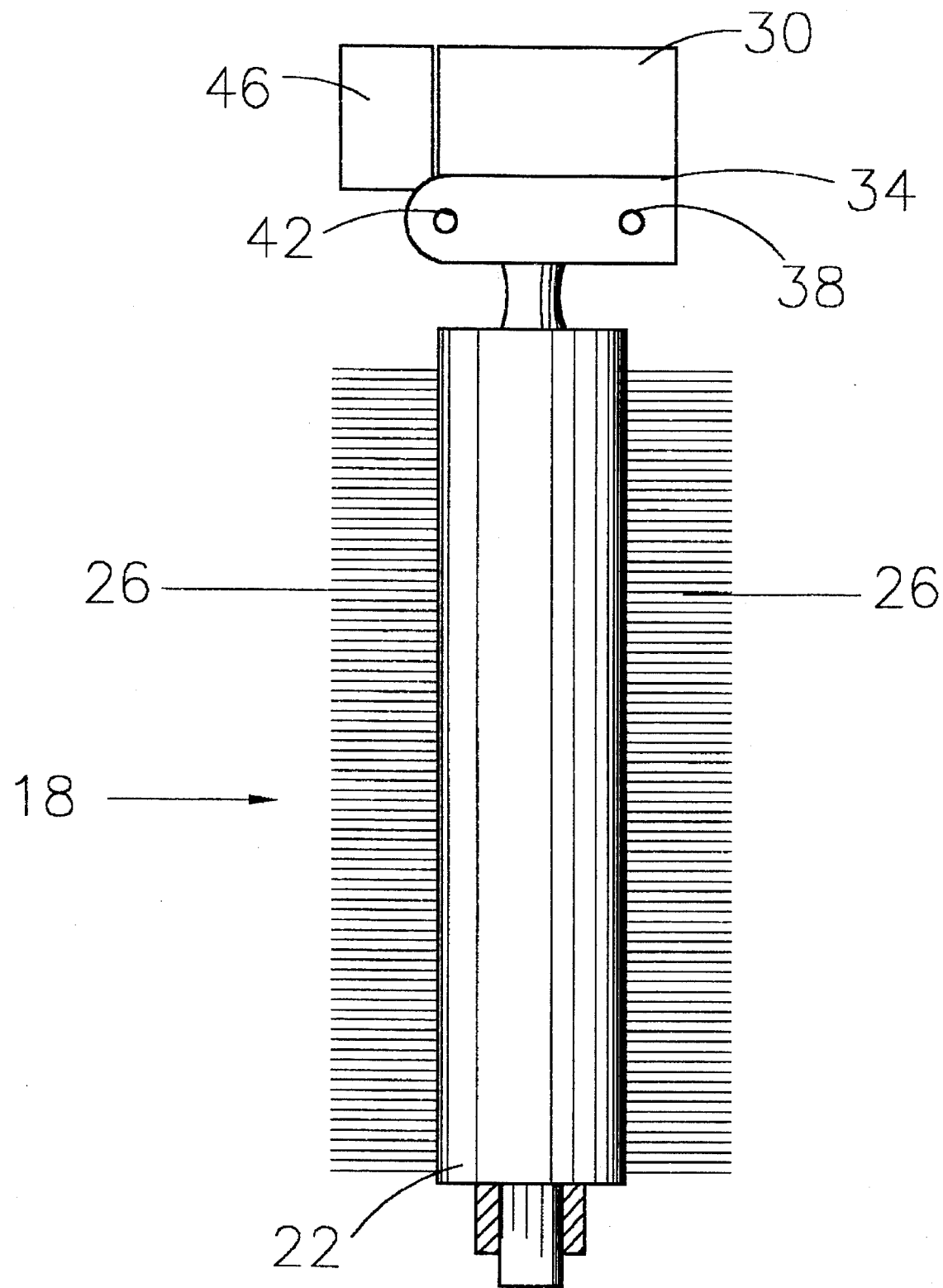
FIG. 2 is a detailed view of the brush and housing of FIG. 1.

The automatic wheel lubricator 10 utilizes a brush 18 or suitable applicator to apply lubricant to the wheel 14. As shown in FIG. 2 with continuing reference to FIG. 1, the brush 18 is the combination of a cylindrical central core 22 and a number of bristles 26 that extend radially from the central core. The brush 18 is rotatable about a central axis x—x that runs through the center of the central core 22. The bristles 26 of the brush 18 are preferably made of a fiber, such as flagged Durastrand fiber.

The brush 18 is attached to a housing 30. The housing 30 has a bracket 34 to hold the brush 18. Bracket pins 38,42 are inserted through holes in the brush 18 and bracket 34 to hold the brush in place. When bracket pin 38 is removed, the bracket 34 tilts down to facilitate removal of the brush 18 for replacement when necessary. The placement of the brush 18 when the bracket 34 is tilted is represent by the dotted line 44 in FIG. 1. The brush 18 is then removed when bracket pin 42 is removed. A new brush 18 may then be inserted in place of the old brush. The brush 18 may rotate freely on its own, or, in a preferred embodiment of the invention, the brush is rotated by a motor 46.

Figure 3:
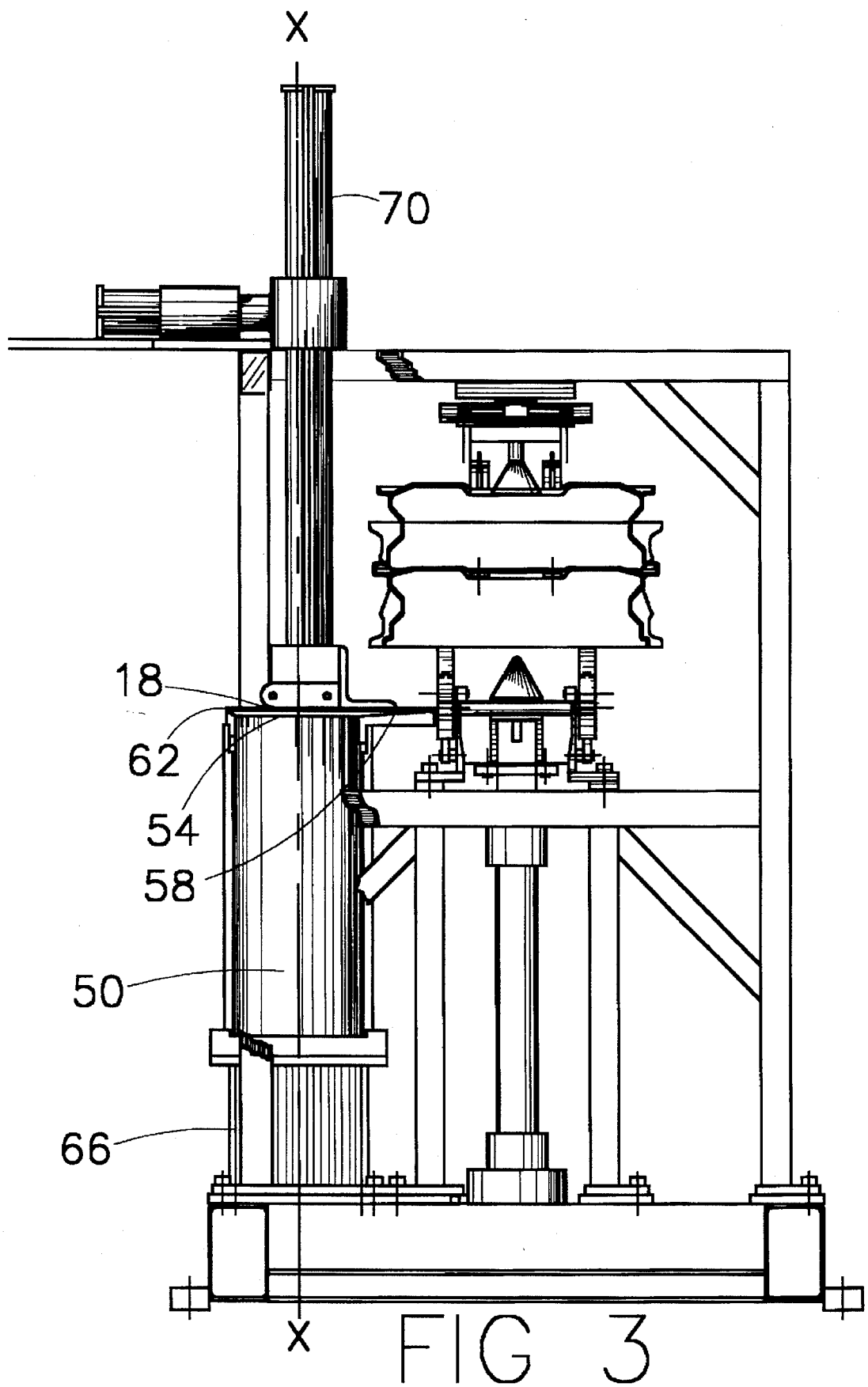
FIG. 3 is a side view of the automatic wheel lubricator of FIG. 1 with the brush inserted in the chamber.

With reference to FIG. 3, lubricant is applied to the brush 18 in a lubrication chamber 50. The chamber 50 is of a generally cylindrical shape with a generally circular opening 54 at the top. The circumference of the opening 54 at the top of the chamber 50 is roughly the same as the circumference of a transverse cross-section of the brush 18. The top of the chamber 50 is covered by a chamber cap 58. The chamber cap 58 has an aperture 62 that corresponds with the opening 54 of the chamber 50. The brush 18 is lowered into the chamber 50, through aperture 62 and opening 54, to be lubricated. The chamber 50 preferably has a pump 66 that circulates lubricant throughout the chamber. The lubricant is then applied to the brush 18 as lubricant is circulated throughout the chamber 50 by the pump 66. The brush 18 is removed from the chamber 50 after the lubricant is applied. The brush 18 may be coated with lubricant on every cycle of applying lubricant to a wheel 14, or the brush may apply lubricant to more than one wheel between coatings in the chamber 50. The frequency of which the brush 18 is placed into the chamber 50 will depend on the amount of lubricant necessary to lubricate each wheel 14 properly.

The brush 18 is preferably moved vertically, along the central axis x—x by a vertical slide cylinder 70, although any suitable method for moving the brush vertically may be employed, such as using a motor or a pulley system. The vertical slide cylinder 70 is a hydraulically or pneumatically operated apparatus that moves one cylinder with respect to a fixed second cylinder. When the vertical slide cylinder 70 is activated, it operates to move the brush 18 from inside the chamber 50, as shown in FIG. 3, to the lubrication position as illustrated in FIG. 1. A stop bar 74 is preferably attached to the housing 30 to prevent the vertical slide cylinder 70 from damaging the brush 18 by lowering the brush to far into the chamber 50. The stop bar 74 rests against the chamber cap 58 when the brush 18 is fully inserted into the chamber 50.

Figure 4:
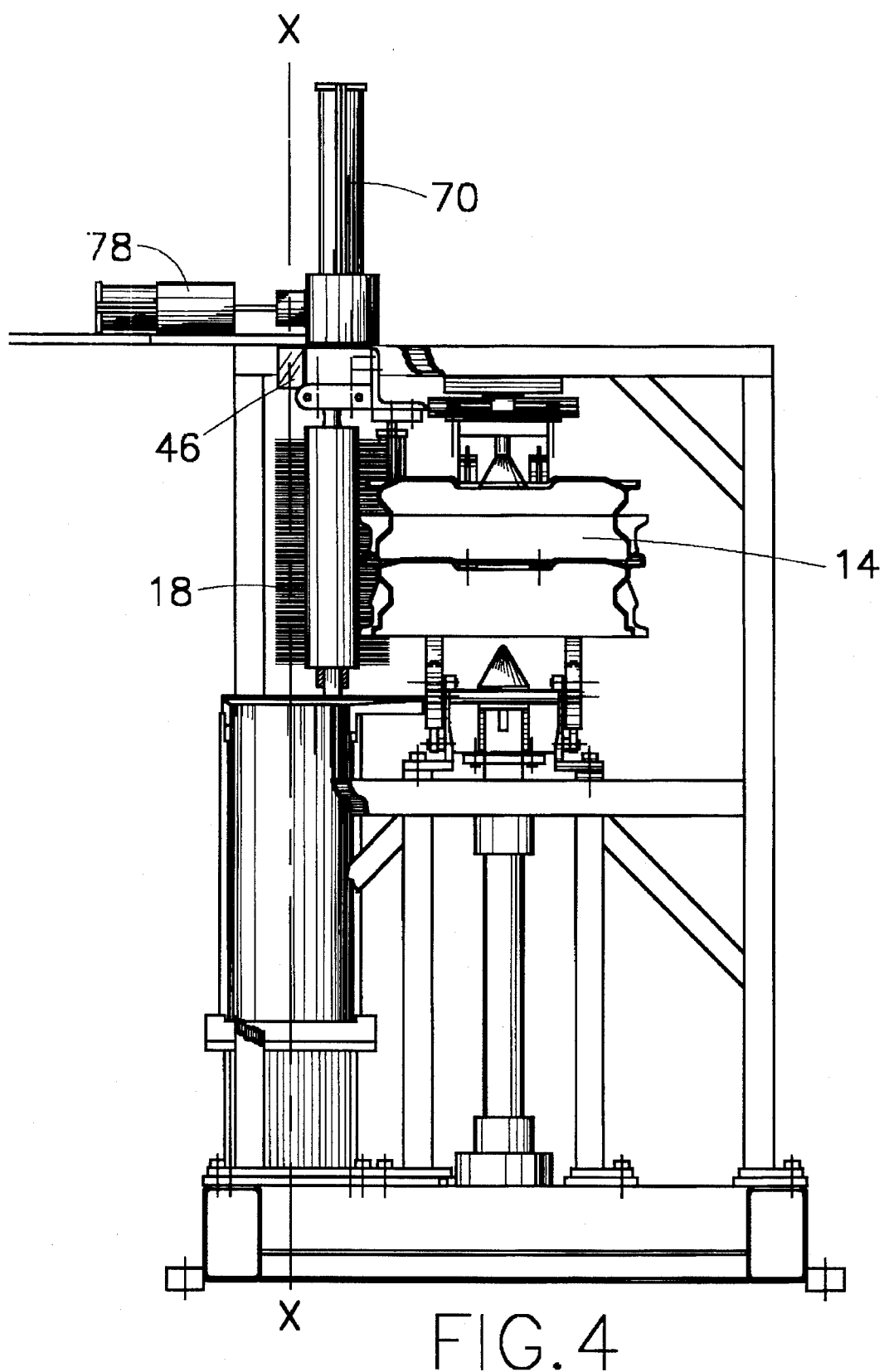
FIG. 4 is a side view of the automatic wheel lubricator of FIG. 1 with the brush in position to lubricate a wheel; and, FIG. 5 is a perspective view of the chamber cap for use with the automatic wheel lubricator of FIG. 1.

As shown in FIG. 4, a horizontal slide cylinder 78, similar to the vertical slide cylinder 70, is utilized to move the brush 18 in a direction generally transverse to axis x—x. The horizontal slide cylinder 78, when activated, moves the brush 18 into contact with the wheel 14. Preferably, the wheel 14 is rotated by any suitable means, and the brush 18 is rotated by motor 46. Mechanical rotation of the wheel 14 and brush 18 help to ensure that the lubricant is applied evenly from the brush to the wheel. The brush 18 may be rotated by the friction of contact with the rotating wheel 14 in some circumstances.

Figure 5:
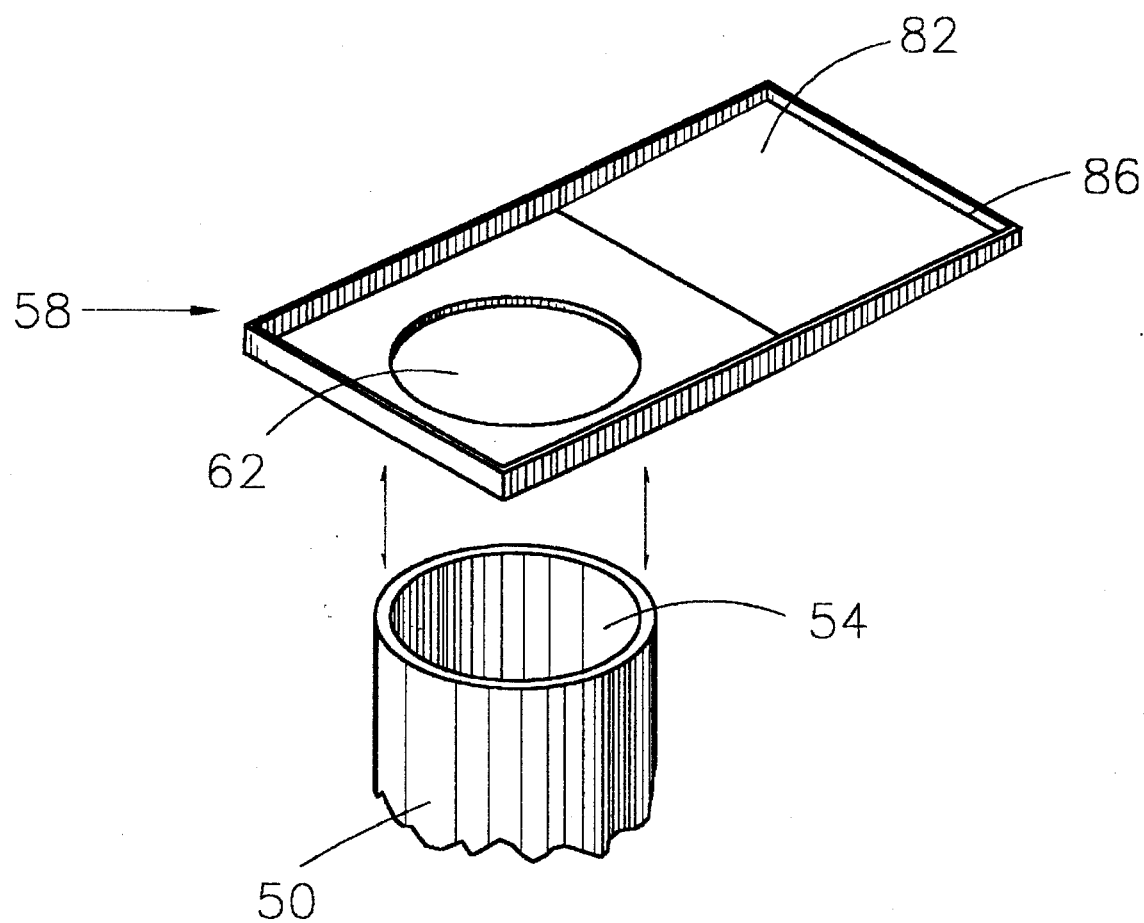

With continuing reference to FIG. 1, FIG. 5 shows a perspective view of the chamber cap 58. The chamber cap 58 has the function of collecting lubricant that drips from the brush 18, as viewed in FIG. 4, as the brush applies lubricant to the wheel 14. The chamber cap 58 is generally rectangular in shape. The chamber cap 58 has a collecting surface 82 for collecting lubricant, and a sidewall 86 to prevent lubricant from spilling over the side of the chamber cap. The collecting surface 82 is preferably sloped downward toward the aperture 62. The slope in the collecting surface 82 allows lubricant to flow back into the chamber 50. The aperture 62 is offset from the center of the chamber cap 58. The placement of the aperture 62, which corresponds to the opening 54 of the chamber 50, allows a portion 90 of the chamber cap 58 to extend outward toward the wheel 14. The portion 90 of the chamber cap 58 that extends outward collects lubricant that drips from the brush 18 during the horizontal movement of the brush from above the chamber 50 to contact with the wheel 14. The chamber cap 58 also functions to prevent lubricant from dripping onto the floor of the workplace, which could, by the very nature of the lubricant, be an occupational safety hazard.

As shown in FIG. 1, the automatic wheel lubricator 10 may be fixedly mounted to the frame 90 of the apparatus delivering the wheel 14 to be lubricated. The automatic wheel lubricator 10 may be incorporated as an original feature, or it may be retrofitted to an existing apparatus. The automatic wheel lubricator 10 may also remain detached and moved into place as needed. The automatic wheel lubricator 10 may be operated by a computer, or the parts of the automatic wheel lubricator may be controlled by an operator.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A lubrication apparatus for applying an associated lubricant to an associated object, said lubrication apparatus comprising:

a brush for applying said associated lubricant to said associated object, said brush being rotatable about a central axis;

a housing for holding said brush, said brush being mounted to said housing;

application means for applying said associated lubricant to said brush;

a chamber positioned below said brush, a top portion of said chamber having an opening, said brush being insertable into said opening of said chamber;

vertical movement means for moving said brush in a generally vertical direction along said central axis in and out of said chamber through said opening; and, horizontal movement means for moving said brush in a generally horizontal direction transverse to said central axis to contact said object.

2. The lubrication apparatus of claim 1 further comprising:

a chamber cap connected to said top portion of said chamber, said chamber cap having an aperture, said aperture corresponding with said opening of said chamber.

3. The lubrication apparatus of claim 2 wherein said chamber cap has a lubricant receiving surface, said lubricant receiving surface being sloped toward said aperture.

4. The lubrication apparatus of claim 3 wherein said chamber cap is generally rectangular in shape.

5. The lubrication apparatus of claim 4 wherein said chamber cap has a center, said aperture being offset from said center of said chamber cap.

6. The lubrication apparatus of claim 1 wherein said brush comprises:

a central core; and, a plurality of bristles extending radially from said central core.

7. The lubrication apparatus of claim 6 wherein said brush is generally cylindrical in shape.

8. The lubrication apparatus of claim 7 wherein brush has a circumference around said bristles, said circumference of said brush being substantially equal to said circumference of said opening of said chamber.

9. The lubrication apparatus of claim 1 further comprising:

a motor connected to said brush, said motor rotating said brush about said central axis.

10. The lubrication apparatus of claim 1 wherein said application means comprises:

a pump operatively connected to said chamber, said pump pumping said associated lubricant throughout said chamber.

11. The lubrication apparatus of claim 1 wherein said vertical movement means comprises:

a vertical slide cylinder connected to said housing, said vertical slide cylinder moving said housing and said brush vertically along said central axis.

12. The lubrication apparatus of claim 1 wherein said horizontal movement means comprises:

a horizontal slide cylinder connected to said housing, said horizontal slide cylinder moving said housing and said brush in a direction transverse to said central axis.

13. The lubrication apparatus of claim 1 wherein said housing comprises:

a bracket for holding said brush, said bracket having holes for receiving bracket pins; and, bracket pins, said bracket pins being selectively engageable with said holes of said bracket to mount said brush.

14. The lubrication apparatus of claim 13 wherein said bracket is tiltably mounted to said housing, thereby allowing said brush to be tilted away from said central axis.

15. A method of lubricating an associated object with an associated lubricant, said method comprising the steps of:

applying said associated lubricant to a brush from a chamber;

moving said brush to a vertical position equal that of said associated object;

moving said brush horizontally to contact said associated object; and, lubricating said associated object by rotating said associated object and said brush.

16. The method of claim 15 further comprising the steps of:

collecting said associated lubricant that drips from said brush with a chamber cap;

returning said associated lubricant collected by said chamber cap to said chamber; and, pumping said associated lubricant through said chamber.

17. A method of replacing a brush of a lubrication apparatus, said lubrication apparatus comprising a housing, said housing further comprising a tiltable bracket and bracket pins for holding said brush, a chamber, and vertical movement means, said method comprising the steps of:

removing said brush from said chamber using said vertical movement means;

tilting said brush and said bracket;

removing said bracket pins from said bracket and said brush;

removing said brush from said bracket;

inserting a new brush into said bracket;

inserting said bracket pins into said bracket and said new brush; and, tilting said brush and said bracket.

18. The apparatus of claim 1 wherein said apparatus wherein said opening being generally circular in shape with a circumference.

* * * * *